(12) United States Patent
Goudon et al.

(10) Patent No.: US 9,133,036 B2
(45) Date of Patent: Sep. 15, 2015

(54) METHOD FOR OBTAINING BORAZANE, SUITABLE FOR OBTAINING HIGHLY PURE AND VERY HIGHLY PURE BORAZANE

(75) Inventors: Jean-Philippe Goudon, Maisons-Alfort (FR); Joël Renouard, Saint Martin en Biere (FR)

(73) Assignee: HERAKLES, Le Haillan (FR)

( * ) Notice: Subject to any disclaimer, the term of this patent is extended or adjusted under 35 U.S.C. 154(b) by 384 days.

(21) Appl. No.: 13/699,260

(22) PCT Filed: May 20, 2011

(86) PCT No.: PCT/FR2011/051149
§ 371 (c)(1),
(2), (4) Date: Jan. 30, 2013

(87) PCT Pub. No.: WO2011/144878
PCT Pub. Date: Nov. 24, 2011

(65) Prior Publication Data
US 2013/0121905 A1    May 16, 2013

(30) Foreign Application Priority Data

May 21, 2010 (FR) .................................... 10 53990

(51) Int. Cl.
*C01B 35/14* (2006.01)
*C01B 35/08* (2006.01)

(52) U.S. Cl.
CPC ............... *C01B 35/146* (2013.01); *C01B 35/08* (2013.01); *C01B 35/14* (2013.01)

(58) Field of Classification Search
CPC ........ C01B 35/08; C01B 35/14; C01B 35/146
See application file for complete search history.

(56) References Cited

U.S. PATENT DOCUMENTS

| | | | |
|---|---|---|---|
| 6,060,623 A * | 5/2000 | Iwasaki | ............................ 564/8 |
| 8,562,768 B2 | 10/2013 | Yvart et al. | |
| 8,637,703 B2 | 1/2014 | Shore et al. | |
| 2007/0116729 A1 | 5/2007 | Palepu | |
| 2007/0128475 A1 | 6/2007 | Blacquiere et al. | |
| 2007/0243122 A1 | 10/2007 | Ramachandran et al. | |
| 2009/0274613 A1 * | 11/2009 | Hamilton et al. | ......... 423/648.1 |

FOREIGN PATENT DOCUMENTS

| | | |
|---|---|---|
| CN | 101330905 | 12/2008 |
| JP | 56158792 | * 12/1981 |
| JP | 2008-024679 | 2/2008 |
| JP | 2009-215249 | 9/2009 |
| JP | 2009-532469 | 9/2009 |
| WO | WO2007/106459 | 9/2007 |
| WO | WO2007/120511 | 10/2007 |
| WO | WO 2008/143780 | 11/2008 |
| WO | WO 2009/124169 | 10/2009 |
| WO | WO 2009/138629 | 11/2009 |
| WO | WO2009/142956 | 11/2009 |

OTHER PUBLICATIONS

P. Veeraraghavan Ramachandran et al.: "Preparation of Ammonia Borane in High Yield and Purity, Methanolysis, and Regeneration", Inorganic Chemistry, vol. 46, Aug. 2007, pp. 7810-7817, XP002616213.
M.G. Hu et al.: "The Thermal Decomposition of Ammonia Borane", Thermochimica Acta, Elsevier Science Publishing Company, Amsterdam, NL, vol. 23, No. 2, Apr. 1978 pp. 249-255, XP026552752.
Hu et al.: "New Synthetic Approaches to Ammonia-Borane and Its Deuterated Derivatives"; J. inorg. nucl. Chem., 1977, vol. 39, pp. 2147-2150.

* cited by examiner

*Primary Examiner* — Anthony J Zimmer
*Assistant Examiner* — Justin Bova
(74) *Attorney, Agent, or Firm* — Hamre, Schumann, Mueller & Larson, P.C.

(57) ABSTRACT

The present invention relates to a method for obtaining borazane, said method being suitable for obtaining borazane containing a low level of impurities. The borazane (obtained by reaction of at least one ammonium salt with at least one alkali and/or alkaline earth metal borohydride) in solution in THF is selectively precipitated with a non-solvent. The precipitated borazane can further be purified by selective dissolution. The borazane obtained after selective precipitation and dissolution contains less than 1% by weight of impurities and/or does not exhibit exothermic decomposition in the solid state with a temperature range of the endothermic melting peak above 110° C.

19 Claims, 6 Drawing Sheets

METHOD FOR OBTAINING BORAZANE, SUITABLE FOR OBTAINING HIGHLY PURE AND VERY HIGHLY PURE BORAZANE

The present invention relates to the obtention of borazane. More specifically, its subject is a method suitable for obtaining borazane containing a low, even very low, level of impurities. According to one advantageous variant, said obtention comprises the successive implementation of two given purification techniques and results in borazane which exhibits no exothermic decomposition in the solid state, before it melts.

The generation of hydrogen from solid compounds is currently one of the ways proposed for supplying fuel cells with hydrogen.

Thus the use of borazane as a solid precursor in the production of hydrogen is known.

In fact said borazane, of chemical formula $BH_3NH_3$, which is obtained in the form of a white crystalline powder, exhibits the unique potential of containing 19.6% of hydrogen by weight. It is thus positioned as a particularly interesting candidate for the solid storage of hydrogen, as a particularly interesting potential product for solid storage of hydrogen.

The synthesis methods for borazane, $BH_3NH_3$, comprising the reaction of at least one ammonium salt (generally selected from ammonium chloride, ammonium sulfate, ammonium carbonate, ammonium formate and mixtures thereof) with at least one alkali and/or alkaline earth metal borohydride (generally selected from lithium borohydride, sodium borohydride and mixtures thereof), in the solvent tetrahydrofuran (THF), are widely described in the literature. Said reaction is generally carried out between such a salt and such a borohydride. The most commonly used method consists in reacting $NaBH_4$ and $(NH_4)_2CO_3$ in THF, for the formation of $BH_3NH_3$, soluble in said THF, and of insoluble $NaCO_3(NH_4)$ and $Na_2CO_3$, which precipitate. At the end of the reaction, the THF solution (therefore containing $BH_3NH_3$ in solution) is filtered to remove from it the greater part of the solids in suspension. The THF solvent is then evaporated. A powder is then recovered which contains essentially borazane, but also impurities such as residual reagents ($NaCO_3(NH_4)$, $Na_2CO_3$, for example), borates, complexes of borazane (($NH_2BH_2)_n$, for example), diborane diammoniate (($NH_3)_2BH_2)^+BH_4^-$), etc.

At the end of such synthesis methods, the borazane obtained does not generally exhibit a purity greater than 95% (by weight). This is also the case with the borazanes marketed at present.

However, the publication entitled "Preparation of Ammonia Borane in High Yield and Purity, Methanolysis and Regeneration", in Inorganic Chemistry, Vol. 46, No. 19, 2007 (pp 7810-7817), describes an obtention method of this type and reports the obtention of a borazane of purity greater than 98%. The method described requires a high level of dilution of the solid substances in the THF solvent (6 L of THF for 37.83 g of sodium borohydride and 132.14 g of ammonium sulfate) of little promise for implementation on the industrial scale. Furthermore, the Applicant has not been able to attain a borazane purity level greater than 90% when carrying out this method.

The obtention of borazane exhibiting a high degree of purity is a real technical problem, quite particularly with reference to the above mentioned use of said borazane as a solid precursor of hydrogen, insofar as the impurities present have an adverse influence on the high-temperature behavior of the product. In fact it is known that said impurities are responsible for the low decomposition (exothermic, in the solid state) and melting temperatures of the product. The borazanes marketed at present, generally obtained by the above mentioned synthesis methods, thus exhibit:

an exothermic decomposition in the solid state starting from 40-55° C., followed by melting in the range from 104-115° C.

These low temperatures render them ill-suited for storage in an operational device the high-temperature behavior specifications of which are often stringent. It therefore appeared highly desirable to have available borazane exhibiting a purity greater than 95% (by weight).

The prior art describes methods for obtaining borazane of a high degree of purity, some not lacking in efficacy.

The patent application WO-A-2007/106459 describes a synthesis of borazane of the above mentioned type which includes the removal of the THF by evaporation and which further comprises a selective extraction of the borazane produced with ethyl ether. In spite of the low solubility of borazane in ethyl ether, such an extraction, operated continuously, is not lacking in efficacy (see examples I and II below and also the appended FIGS. 1B and 1C) but it is difficult to implement, especially on the industrial scale, and the production cost is high.

The publication entitled "The thermal decomposition of ammonia borane", in Thermochimica Acta, 23 (1978) 249-255, presents analysis of borazane purified according to methods described in "New synthetic approaches to ammonia-borane and its deuterated derivatives", J. inorg. nucl. Chem., 1977, Vol. 39, pp. 2147-2150. The purification of the borazane, a priori the most efficient, is performed by sublimation under vacuum at 60° C. This purification method is not industrializable as it requires powerful installations for applying vacuum.

The patent application WO 2007/120511 describes the synthesis of borazane from an amine borane complex. Such a complex is reacted with gaseous ammonia, said gaseous ammonia being bubbled through a solution of said complex. The Applicant has evaluated this method according to the examples cited, but did not obtain a synthesis yield of more than 50%. Nor did it obtain a borazane of required purity.

The patent application WO 2009/142956 describes the synthesis of borazane in two stages: a first stage of obtention of ammonium borohydride (by reaction of a borohydride salt with an ammonium salt in liquefied ammonia) then a second stage of decomposition of said ammonium borohydride in an ether solvent. The obtention of ammonium borohydride is performed at low temperature or under pressure (i.e. under ammonia liquefaction conditions) and thus requires specific synthesis installations limiting its exploitation on the industrial scale.

The prior art thus does not describe a method for obtaining borazane exhibiting a high degree of purity, readily industrializable, and implemented under ambient pressure and temperature conditions.

Of course, those skilled in the art know, in a general manner, various conventional purification methods and in particular such purification methods based on selective precipitations. However, the prior art has never mentioned the application of such methods in the context of the obtention of borazane of a high degree of purity. There appears to be a real prejudice as regards the existence of effective solvent/non-solvent couples for the implementation of such methods of selective precipitation, in this context, insofar as the by-products of the conventional synthesis of borazane (see above) (such as residual reagents (such as for example $NaCO_3(NH_4)$ or $Na_2CO_3$), complexes of borazane (for example of formula ($NH_2BH_2)_n$), borates or diborane diammoniate (($NH_3)_2$ $BH_2)^+BH_4^-$), etc.) exhibit solubility characteristics close to those of borazane.

Those skilled in the art are thus currently searching for a method, applicable at reasonable cost on the industrial scale, for obtaining borazane, with a degree of purity such that it exhibits a high-temperature behavior (improved compared to that of the borazanes marketed at present) compatible with working use as a solid source of hydrogen.

With reference to this technical problem, the inventors propose a novel method for obtaining borazane, said method being suitable for obtaining borazane containing a low level of impurities. Said method is suitable in particular for providing borazane containing at the maximum 2% by weight of impurities, even less than 1% by weight of impurities and then no longer exhibiting exothermic decomposition in the solid state, with a temperature range of the endothermic melting peak above 110° C. Said method comprises one (selective precipitation with a particular non-solvent) or two (selective precipitation with a particular non-solvent+selective dissolution with a particular solvent) specific stages of purification of the borazane obtained by reaction between at least one ammonium salt and at least one alkali and/or alkaline earth metal borohydride in THF. Said (single) purification stage or said first purification stage (of the two stages) of the method of the invention can be performed after the synthesis, the borazane synthesized being kept in the reaction medium (without being isolated therefrom), or after recovery of the borazane thus synthesized (for example on commercial borazane thus synthesized). The specific purification(s) proposed according to the invention have surprisingly been found to be very effective for the removal of the impurities present at the end of the synthesis cited (by reaction between at least one ammonium salt and at least one alkali and/or alkaline earth metal borohydride).

According to its first subject, the present invention thus relates to a method for obtaining borazane. Said method, characteristically, comprises the implementation of the successive stages below:

a) obtention of a solution of borazane in a solvent consisting of tetrahydrofuran containing less than 100 ppm of water, advantageously less than 10 ppm of water; said borazane having been synthesized by reaction of at least one ammonium salt with at least one alkali and/or alkaline earth metal borohydride in said solvent or said borazane having been dissolved in said solvent, after having been synthesized by reaction of at least one ammonium salt with at least one alkali and/or alkaline earth metal borohydride in tetrahydrofuran containing less than 100 ppm of water, advantageously less than 10 ppm of water;

b) precipitation of the borazane by addition to said solution of a non-solvent of borazane, containing less than 100 ppm of water, advantageously less than 10 ppm of water, and selected from the chlorinated solvents, fluorinated solvents, linear, branched and cyclic alkanes, and mixtures thereof;

c) recovery, advantageously by filtration, of said precipitated borazane;

d) possible drying of said recovered precipitated borazane; (said recovered precipitated, possibly dried, borazane containing fewer impurities than the borazane in said solution of borazane).

It possibly further comprises (for the obtention of borazane containing still less impurities):

e) hot dissolution, at a temperature lower than the decomposition temperature of the borazane, of said recovered precipitated borazane, advantageously dried, in a solvent from the alcohol family, having a molecular weight greater than or equal to 60 g/mol and containing less than 100 ppm of water, advantageously less than 10 ppm of water;

f) hot removal, advantageously by filtration, of impurities insoluble in said solvent;

g) precipitation of the borazane dissolved in said solvent by cooling;

h) recovery, advantageously by filtration, of the precipitated borazane; and i) possible drying of said recovered precipitated borazane.

The method of the invention is performed on borazane prepared by the synthesis route indicated. More precisely, it is performed on a solution containing such a borazane. This solution is a solution which contains no solid in suspension and which contains THF as solvent.

This solution can exist according to two variants.

According to a first variant, it is derived directly from, even (essentially) consists of, the reaction medium in which said borazane was synthesized. According to this first variant, the method of the invention is performed after the synthesis, indeed directly at the end of said synthesis (the borazane synthesized having, in any case, not been isolated). In the context of this first modification, the obtention of the solution of borazane advantageously comprises:

$a_1$) synthesis of the borazane, by reaction, in tetrahydrofuran containing at the maximum 100 ppm of water, advantageously at the maximum 10 ppm of water, of at least one ammonium salt with at least one alkali and/or alkaline earth metal borohydride, and $a_2$) removal, advantageously by filtration, of the solids from the reaction medium.

It very advantageously comprises, in addition to said two stages $a_1$ and $a_2$ above, the stage $a_3$ below:

$a_3$) concentration, advantageously by evaporation of part of the solvent, of the filtered reaction medium.

This concentration stage makes it possible then to minimize the quantity of non-solvent necessary for the precipitation of the borazane.

According to a second variant, the starting solution is made up from solid borazane (previously synthesized by the specified reaction and isolated, in the powder state), by dissolution of said solid borazane (by "re-dissolution" thereof) in THF. Said solid borazane can have been stored, for a greater or lesser time, in the powder state. It can in particular be commercial borazane.

The THF wherein the borazane to be purified according to the invention is present in solution is dry, in other words it contains less than 100 ppm of water (advantageously less than 10 ppm of water). Those skilled in the art will readily understand this requirement for the "non-presence" of water in the starting solution but also throughout the method, insofar as water is capable of generating impurities, such as boric acid derivatives.

The borazane in solution is purified by selective precipitation by means of a non-solvent. It is to the inventors' credit that they have shown that this method of purification, with a non-solvent of suitable nature, is effective in this particular context.

The selective non-solvent according to the invention is selected, as indicated above, from chlorinated solvents such as dichloromethane and 1,2-dichloroethane, fluorinated solvents such as hydrofluoro ethers (for example 2-trifluoromethyl-3-ethoxydodecafluorohexane), linear, branched and cyclic alkanes such as cyclohexane, (said alkanes obviously being liquid at the temperature of implementation of the method, generally the ambient temperature), and mixtures thereof. Said non-solvent advantageously consists of dichloromethane.

The precipitated borazane is recovered. It is advantageously dried. Such drying makes it possible to remove the residual THF, which may contain impurities.

At the end of stages a) to c), even a) to d), as specified above, borazane purified compared to that in solution in the starting solution is obtained.

It is in particular possible thus to obtain borazane exhibiting a purity ranging between 98 and 99% by weight. This mass proportion of borazane, contained in the borazane powder obtained, is greater than that of the products commercially available (it has been seen that said commercial products generally exhibit a content of borazane by weight less than or equal to 95%).

Incidentally, let us note that purifications described in the prior art also make it possible to obtain such degrees of purity. However, it has been seen that the technologies in question are difficult to implement industrially. Those skilled in the art have by now already understood that a precipitation with the solvent/non-solvent pairs selected according to the invention is easier to perform industrially.

It is quite possible for the method of the invention, suitable for obtaining borazane containing a low level of impurities (in particular ≤2% by weight) and thus exhibiting a temperature of starting exothermic decomposition in the solid state higher than that of the non-purified product (in particular ≥85° C.) to comprise only the single purification stage described above (stage b), in other words essentially to consist in the sequence of above mentioned stages a) to c), even a) to d). It has been understood that the implementation of stage d) is advantageous.

For obtaining borazane of still higher purity, the inventors have demonstrated the value that exists in adding a second specific purification stage (stage e) to the (first) purification stage (stage b above).

Thus, the method of the invention, in addition to said stages a) to c), even a) to d), above, advantageously includes the stages e) to h), even e) to i). Advantageously, said method thus essentially consists in the implementation of said successive stages a) to c), possibly d), e) to h) and possibly i). It has been understood that the implementation of the possible drying stages (d) and i)) is generally favorable.

Thus, in the context of this variant, the borazane purified according to stage b) above is again purified according to stage e). Said stage e) is a selective dissolution.

The nature of the solvent is critical. As indicated above, said solvent is selected from alcohols having a molecular weight greater than or equal to 60 g/mol (methanol and ethanol with which borazane reacts hot are thus excluded) and containing less than 100 ppm, advantageously less than 10 ppm, of water. It is advantageously selected from butanol, t-butanol and isopropanol. It very advantageously consists of isopropanol.

The dissolution is performed hot, typically at a temperature lying between 70 and 80° C.

It is to the inventors' credit that they have demonstrated the value of adding this second purification, with selection of suitable solvent, to the first purification described above. Said second purification, performed with other solvents, such as methyl t-butyl ether (MTBE), is not effective (see example 3 below and the attached FIG. 2C). Said second purification, performed on borazane which has not been subjected to said first purification, is not effective either.

Incidentally, it may be noted here that the method of the invention specifically follows on from a borazane synthesis by reaction of at least one ammonium salt with at least one alkali and/or alkaline earth metal borohydride (said at least one alkali and/or alkaline earth metal borohydride is generally selected from lithium borohydride, sodium borohydride, calcium borohydride and mixtures thereof). Advantageously, said at least one ammonium salt is selected from ammonium chloride, ammonium sulfate, ammonium carbonate, ammonium formate and mixtures thereof and/or, advantageously and, said at least one alkali and/or alkaline earth metal borohydride is selected from lithium borohydride, sodium borohydride and mixtures thereof.

Very advantageously, said at least one ammonium salt consists of ammonium carbonate and said at least one alkali and/or alkaline earth metal borohydride consists of sodium borohydride.

The borazane obtained at the end of the implementation of the method of the invention including the second purification stage is a particularly valuable product.

It contains less than 1% by weight of impurities, generally between 0.1 and less than 1% by weight of impurities. It does not exhibit exothermic decomposition in the solid state and its temperature range of the endothermic melting peak thereof is above 110° C.

Those skilled in the art, with reference to the technical problem disclosed in the introduction of the present text, will have perfectly understood the value of the method of the invention and that of the purified borazane obtained at the end of its implementation. Said purified borazane is more stable thermally and exhibits a melting temperature higher than that of commercial borazanes. The value of the borazane obtained which exhibits no exothermic decomposition in the solid state is quite especially emphasized.

It is now proposed to illustrate the invention, in no way restrictively, by the appended figures and the examples below.

Said appended figures are thermograms obtained by differential scanning calorimetry (DSC). This analytical method was performed in the standard way (see the standard NF EN ISO 11357-1).

The characteristics of said thermograms are summarized in table 1 below.

TABLE 1

| Borazane | DSC results | |
| --- | --- | --- |
| | Temperature of starting exothermic decomposition in the solid state | Temperature range of the endothermic melting peak |
| Product A | 53° C. | 105-111° C. |
| Product B | 44° C. | 104-116° C. |
| Product C | 92° C. | 110-117° C. |
| Ex. 1 | 87° C. | 111-118° C. |
| Ex. 2 | / | 111-120° C. |
| Ex. 3 | 88° C. | 112-118° C. |

Products A and B and those obtained in examples 1 and 2 were also analyzed by nuclear magnetic resonance to evaluate their purity. The results are shown in table 2 below.

EXAMPLE I a) Synthesis and Removal of Solids from the Reaction Medium 288 g of ammonium carbonate and 4 liters of dry tetrahydrofuran (0.0005% water) are introduced into a 4 liter reactor fitted with a stirring device and a condenser and placed under an argon blanket.

112 g of sodium borohydride previously conditioned for 2 hrs in an oven at 140° C. are introduced into this mixture.

The medium is left for 12 hrs whilst stirring at a temperature of 40° C.

After this time, the medium is filtered to remove the unconsumed reagents and the sodium carbonate formed.

b) Evaporation of the Solvent

The solution of borazane in tetrahydrofuran obtained is again introduced into the reactor. The solvent (THF) is evaporated, and the borazane (product B) is then recovered.

Figure 1A:
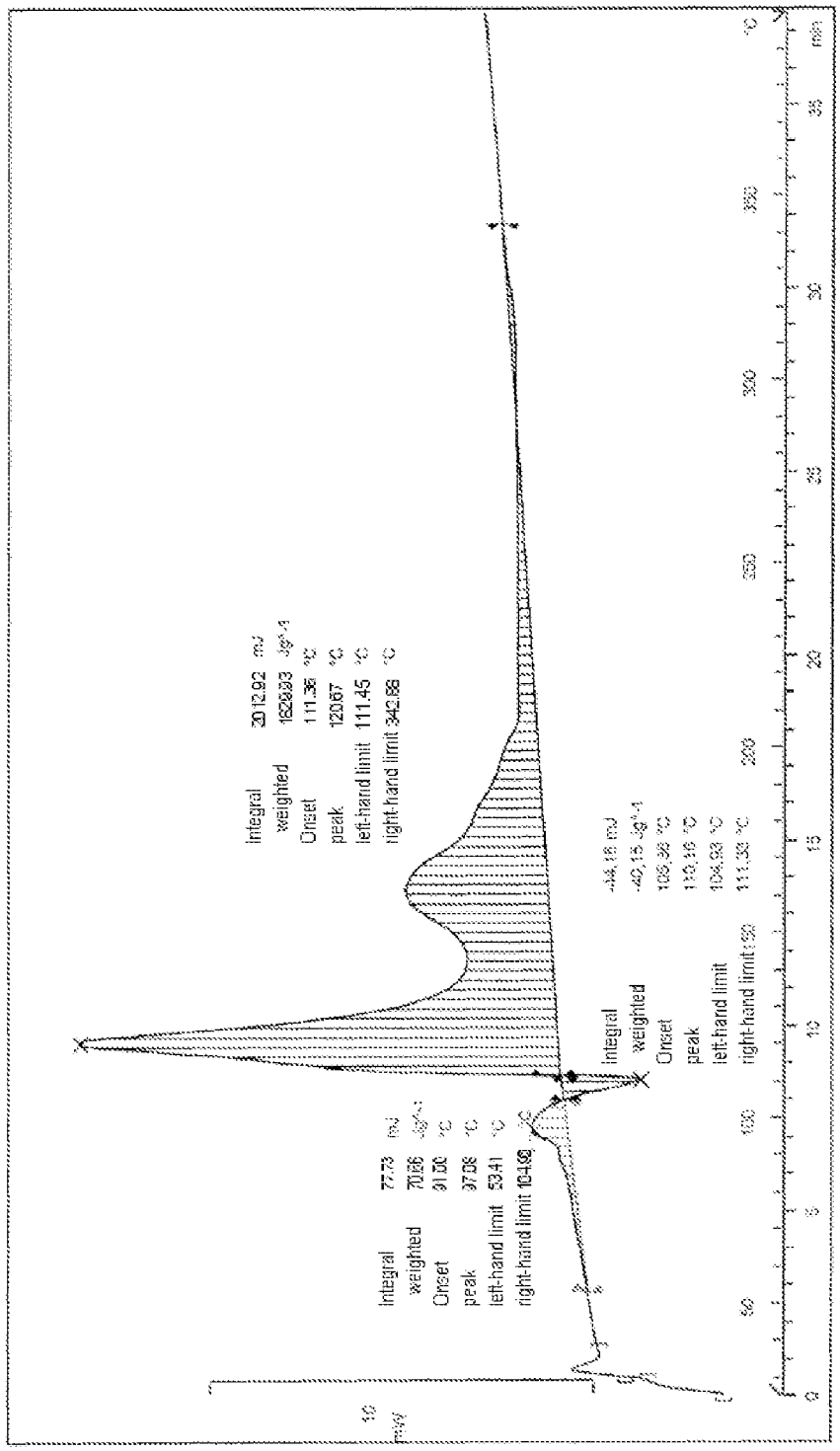
FIG. 1A is the thermogram of the borazane (product A) marketed by Aldrich (lot 12722AJ).
Figure 1B:
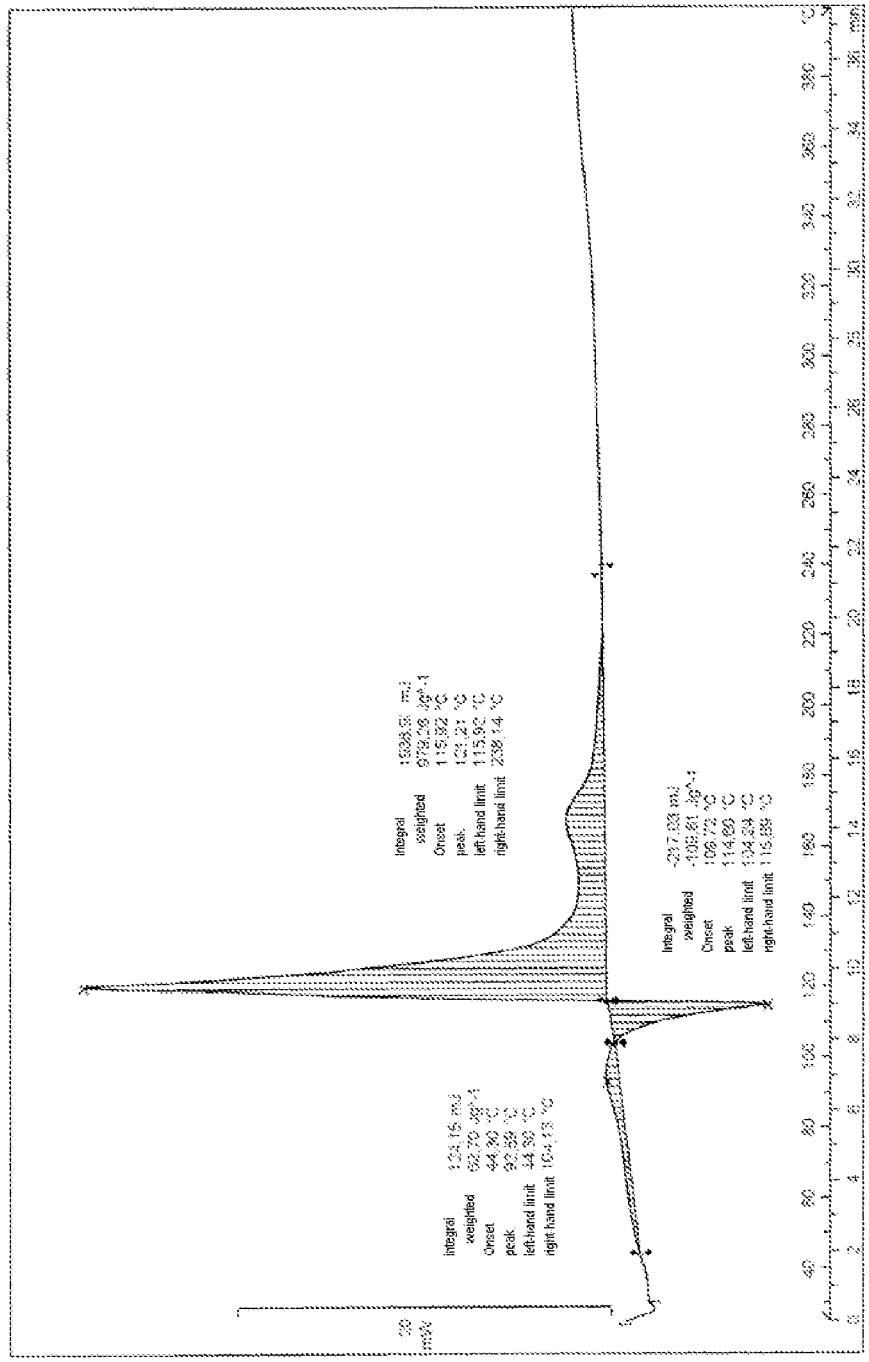
FIG. 1B is the thermogram of the borazane (product B) obtained at the end of its synthesis, after evaporation of the solvent (THF) from the reaction medium (see example I below).

The thermogram of said borazane is shown in the appended FIG. 1B. It includes an exothermic decomposition in the solid state at low temperature (44° C.). Its characteristics were recorded in table 1 above.

Said borazane (product B) was also analyzed by nuclear magnetic resonance ($^1$H NMR with internal standard) to evaluate its purity. The results are shown in table 2 below.

EXAMPLE II a) Synthesis and Removal of Solids from the Reaction Medium

Stage a) of example I above is repeated.

b) Extraction with Ethyl Ether

The crude solid borazane recovered after evaporation of the THF is introduced into a Soxhlet type extractor. The extraction is performed by an ethyl ether reflux according to the teaching of the application WO 2007/106459. The extraction is performed at 35° C. for 12 hrs.

c) Evaporation of the Solvent

After the extraction, the ethyl ether is evaporated and the borazane is recovered then dried and finally stored under an argon atmosphere.

Figure 1C:
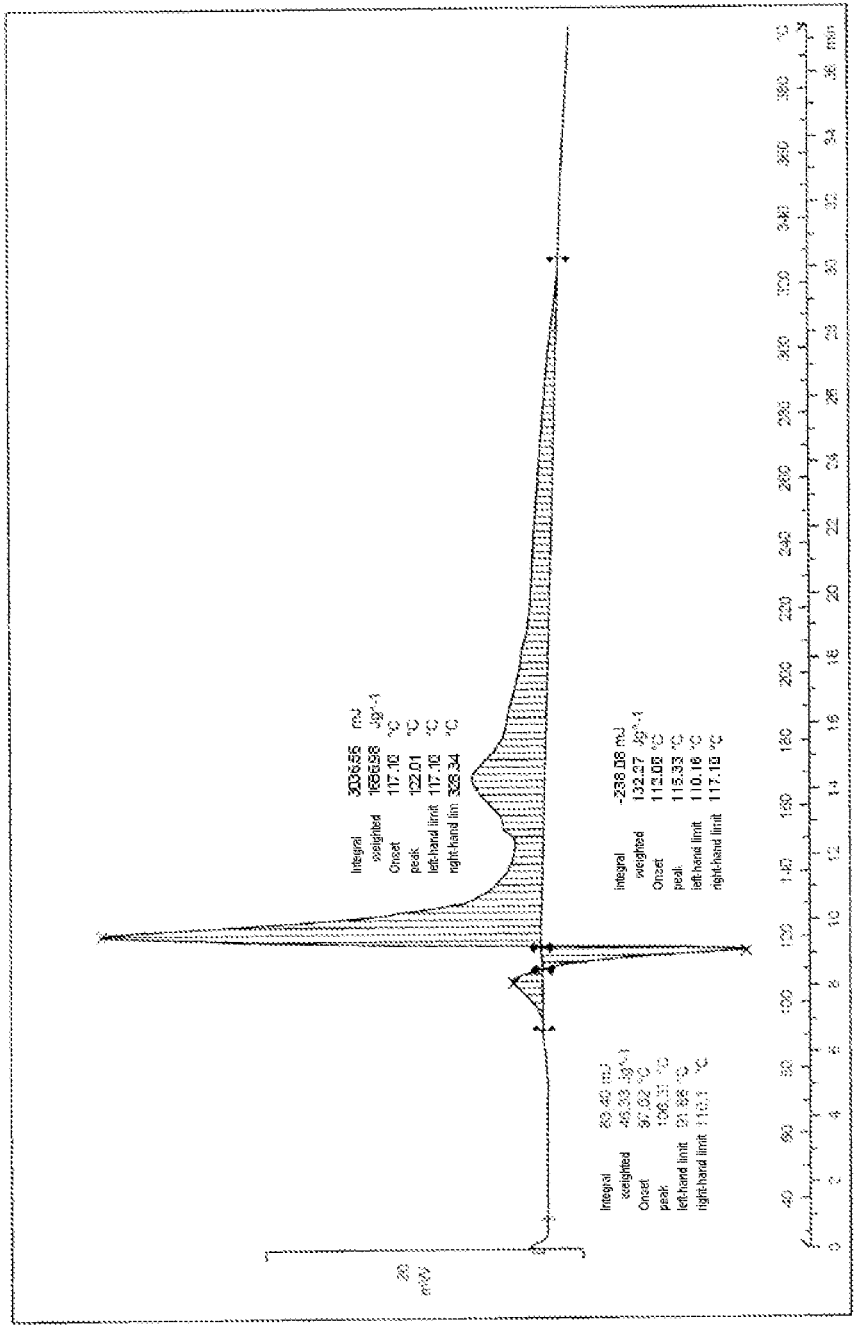
FIG. 1C is the thermogram of the borazane (product C) obtained at the end of its synthesis, after evaporation of the solvent (THF) from the reaction medium and after purification by continuous extraction with ethyl ether (see example II below).

The thermogram of the extracted borazane (product C) is shown in the appended FIG. 1C. It includes an exothermic decomposition in the solid state at a temperature much higher than that of the exothermic decomposition of products A and B. Its characteristics were recorded in table 1 above.

EXAMPLE 1 a) Synthesis and Removal of Solids from the Reaction Medium

Stage a) of example I above is repeated.

b) Purification According to the Invention

The solution of borazane in tetrahydrofuran is again introduced into the reactor and is then partially evaporated until the obtention of a vessel bottom of 400 ml, representing 10% of the whole of the THF introduced at the start of the synthesis.

2.5 liters of dry dichloromethane (0.005% water) are then introduced into the reactor with vigorous stirring. Precipitation of the borazane takes place, and it is filtered then dried in an oven under vacuum at 20° C. for 12 hrs.

A mass of 70 g of borazane powder is recovered. The yield from the method is thus greater than 70%.

Figure 2A:
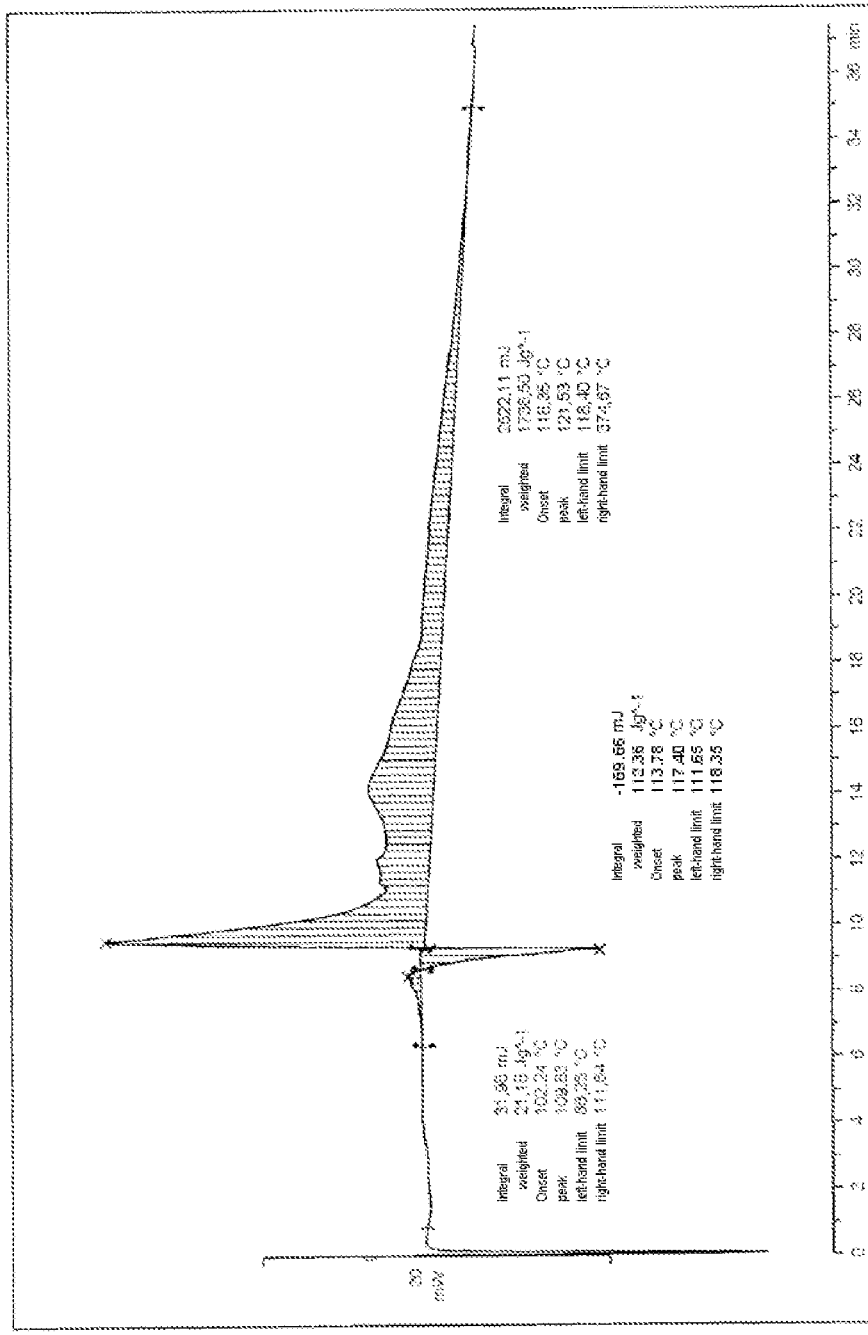
FIG. 2A is the thermogram of the borazane obtained according to a variant (an advantageous variant) of the method of the invention comprising the synthesis of said borazane and purification thereof by precipitation with the non-solvent dichloromethane (see example 1 of the invention).

The thermogram of said powder is shown in the appended FIG. 2A. It includes an exothermic decomposition in the solid state at a temperature much higher than that of said exothermic decomposition of products A and B. Its characteristics were recorded in table 1 above. Said powder was also analyzed by nuclear magnetic resonance ($^1$H NMR with internal standard) to evaluate its purity. The results are shown in table 2 below.

EXAMPLE 2 a) Synthesis and Removal of Solids from the Reaction Medium

Stage a) of example I above is repeated.

b) Purification According to the Invention

Stage b) of example 1 above is repeated.

c) Second Purification According to the Invention

The mass of 70 g of borazane powder recovered is then dissolved in 0.7 liters of dry isopropanol (0.0005% water) raised to a temperature of 76° C.

The solution is filtered hot to remove the insoluble matter and cooled slowly to a temperature of −10° C. in order to cause the borazane contained in the solution to precipitate.

The solution is filtered in order to recover the precipitate comprising a borazane powder of very high purity. Said powder is dried for 24 hrs in an oven under vacuum at 35° C.

A mass of 60 g of powder is recovered. The yield from the method (including both purification stages) is thus greater than 65%.

Figure 2B:
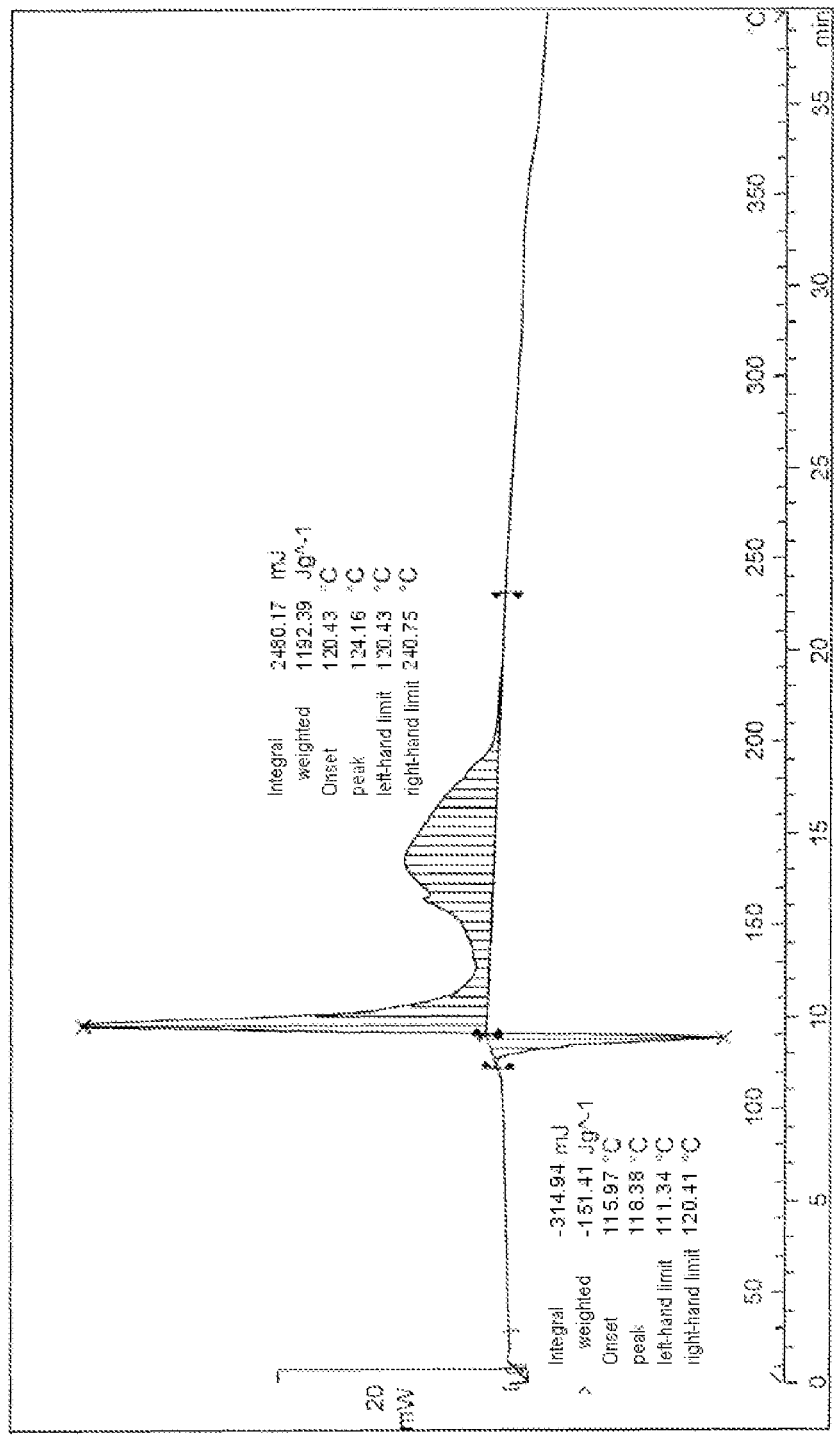
FIG. 2B is the thermogram of the borazane obtained according to a variant (a very advantageous variant) of the method of the invention comprising the synthesis of said borazane and two consecutive purifications thereof: 1) by precipitation with the non-solvent dichloromethane, then 2) by extraction with isopropanol (see example 2 of the invention).

The thermogram of said powder is shown in the appended FIG. 2B. It does not include an exothermic decomposition in the solid state. Its characteristics were recorded in table 1 above.

Said powder was also analyzed by nuclear magnetic resonance ($^1$H NMR with internal standard) to evaluate its purity. The results are shown in table 2 below.

Said table 2 confirms the high levels of purity of the borazanes prepared according to the invention. These high purity levels explain the particularly interesting results in terms of thermal behavior (see the appended thermograms).

TABLE 2

| Borazane | Weight Percentage | | | |
|---|---|---|---|---|
| | $BH_3NH_3$ | $NH_3/NH_3$ in pure $BH_3NH_3$ | $BH_3/BH_3$ in pure $BH_3NH_3$ | H |
| Product A | 93.5% | 97.3% | 89.2% | 18% |
| Product B | 89.4% | 91.9% | 87% | 17.2% |
| Ex. 1 | 98.9% | 98.1% | 99.8% | 19.1% |
| Ex. 2 | 99.8% | 100% | 99.7% | 19.3% |

EXAMPLE 3 a) Synthesis and Removal of Solids from the Reaction Medium

Stage a) of example 1 above is repeated.

b) Purification According to the Invention

Stage b) of example 1 above is repeated.

c) "Second Purification"

Stage c) of example 2 above is repeated substituting methyl t-butyl ether (MTBE, dry, containing 50 ppm of water) for the isopropanol.

Figure 2C:
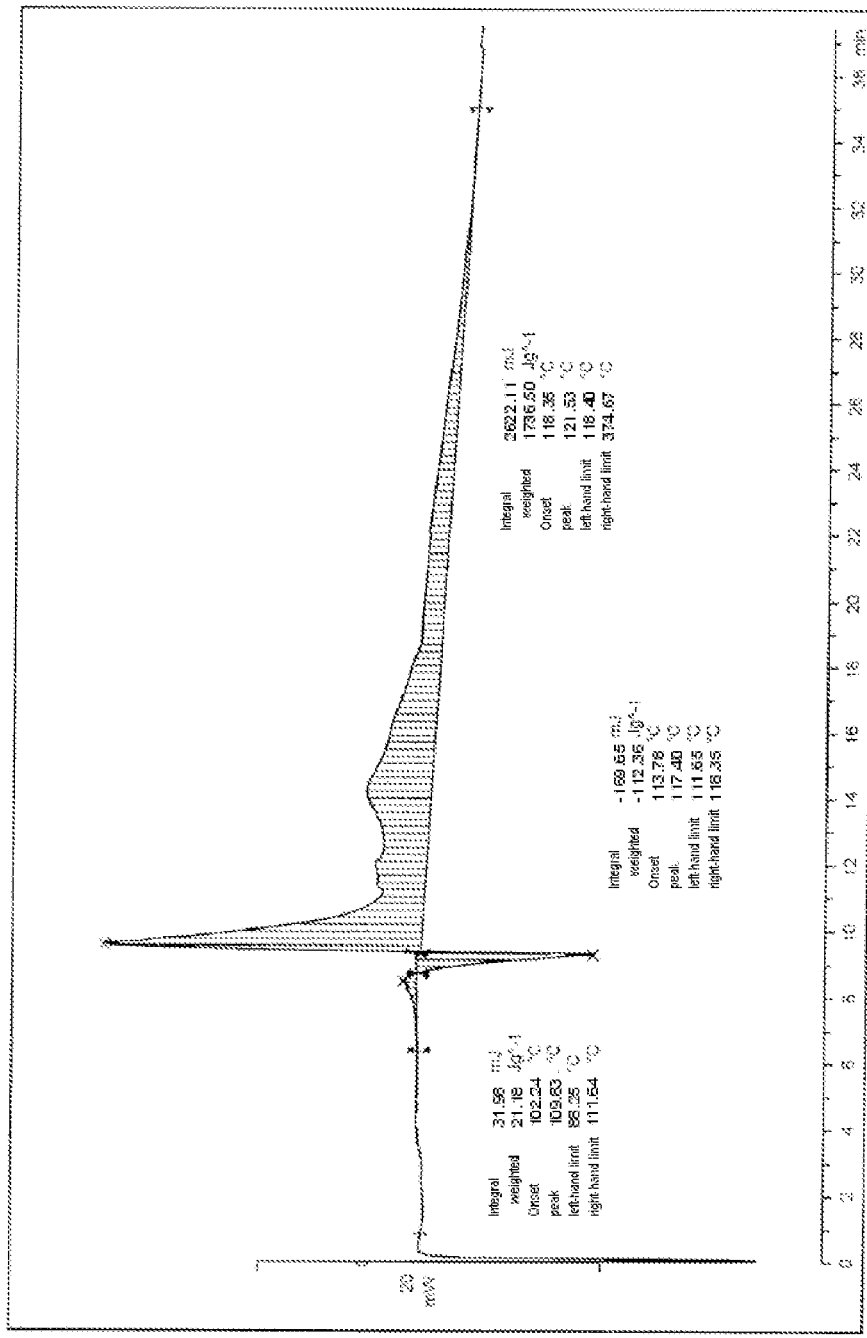
FIG. 2C is the thermogram of the borazane obtained according to an embodiment of the method of the invention comprising the synthesis of said borazane and two consecutive purifications thereof: 1) by precipitation with the non-solvent dichloromethane, then 2) by extraction with MTBE (see example 3 below). It is confirmed that said purification with MTBE is hardly favorable.

The thermogram of the powder obtained is shown in the appended FIG. 2C. It includes an exothermic decomposition in the solid state, at a temperature much higher than that of said thermal decomposition of products A and B. Its characteristics were recorded in table 1 above.

This example shows that a second purification stage, by dissolution of the borazane obtained at the end of the first purification stage (by precipitation with a non-solvent), does not inevitably have an effect. The nature of the dissolution solvent appears critical.

The invention claimed is:

1. A method for obtaining borazane, comprising the implementation of the successive stages below:
   a) providing a solution of borazane in a solvent consisting of tetrahydrofuran containing less than 100 ppm of water; wherein said borazane has been synthesized by reaction of at least one ammonium salt with at least one alkali metal borohydride and/or alkaline earth metal borohydride in said solvent, or said borazane has been dissolved in said solvent after having been synthesized by reaction of at least one ammonium salt with at least one alkali metal borohydride and/or alkaline earth metal borohydride in tetrahydrofuran containing less than 100 ppm of water;
   b) precipitation of the borazane by addition to said solution of a non-solvent of borazane, containing less than 100 ppm of water, and selected from the group consisting of chlorinated solvents, fluorinated solvents, linear, branched and cyclic alkanes, and mixtures thereof;
   c) recovery of said precipitated borazane;
   d) optionally drying said recovered precipitated borazane;
   e) hot dissolution, at a temperature lower than the decomposition temperature of the borazane, of said optionally dried recovered precipitated borazane, in a solvent from the alcohol family, having a molecular weight greater than or equal to 60 g/mol and containing less than 100 ppm of water;
   f) hot removal of impurities insoluble in said solvent;
   g) precipitation of the borazane dissolved in said solvent by cooling;
   h) recovery of the borazane precipitated in step g); and
   i) optionally drying said recovered borazane from step h).

2. The method as claimed in claim 1, which comprises, for obtaining said solution of borazane:
   $a_1$) synthesis of the borazane, by reaction, in tetrahydrofuran containing less than 100 ppm of water, of at least one ammonium salt with at least one alkali metal borohydride and/or alkaline earth metal borohydride, and
   $a_2$) removal, of solids from the reaction medium.

3. The method as claimed in claim 2, which further comprises, for obtaining said solution of borazane:
   $a_3$) concentration, of said reaction medium from which the solids were removed.

4. The method as claimed in claim 1, wherein said non-solvent consists of dichloromethane.

5. The method as claimed in claim 1, wherein said solvent from the alcohol family in stage (e) is selected from the group consisting of butanol, t-butanol and isopropanol.

6. The method as claimed in claim 1, wherein said hot dissolution in stage (e) is performed at a temperature lying between 70 and 80° C.

7. The method as claimed in claim 1, wherein said at least one ammonium salt is selected from the group consisting of ammonium chloride, ammonium sulfate, ammonium carbonate, ammonium formate and mixtures thereof and/or said at least one alkali metal borohydride and/or alkaline earth metal borohydride is selected from the group consisting of lithium borohydride, sodium borohydride and mixtures thereof.

8. The method as claimed in claim 1, wherein said at least one ammonium salt consists of ammonium carbonate and said at least one alkali metal borohydride and/or alkaline earth metal borohydride consists of sodium borohydride.

9. The method as claimed in claim 1, wherein the solvent in stage a) contains less than 10 ppm of water.

10. The method as claimed in claim 1, wherein the non-solvent in stage b) contains less than 10 ppm of water.

11. The method as claimed in claim 2, wherein the tetrahydrofuran in stage $a_1$) contains less than 10 ppm of water.

12. The method as claimed in claim 5, wherein said solvent from the alcohol family in stage e) is isopropanol.

13. The method as claimed in claim 1, wherein the recovery in stage c) comprises filtration.

14. The method as claimed in claim 3, wherein the concentration of stage $a_3$) comprises evaporation of part of the solvent.

15. The method as claimed in claim 1, wherein the solvent from the alcohol family in stage e) contains less than 10 ppm of water.

16. The method as claimed in claim 1, wherein, in stage a), said borazane has been dissolved in said solvent after having been synthesized by reaction of at least one ammonium salt with at least one alkali metal borohydride and/or alkaline earth metal borohydride in tetrahydrofuran containing less than 10 ppm of water.

17. The method as claimed in claim 1, wherein at least one of the hot removal of stage f) and the recovery of stage h) comprises filtration.

18. The method as claimed in claim 2, wherein the removal of stage $a_2$) comprises filtration.

19. The method as claimed in claim 1, which consists essentially of stages a), b), c), optionally d), e), f), g), h) and optionally i).

* * * * *